United States Patent
Hartman et al.

(10) Patent No.: US 10,019,714 B1
(45) Date of Patent: *Jul. 10, 2018

(54) SYSTEMS AND METHODS FOR PROVIDING CARD ACCOUNT CONTROLS AND PURCHASE IMPACT INFORMATION

(71) Applicant: United Services Automobile Association (USAA), San Antonio, TX (US)

(72) Inventors: Wayne Maurice Hartman, San Antonio, TX (US); Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 177 days.

This patent is subject to a terminal disclaimer.

(21) Appl. No.: 14/449,892

(22) Filed: Aug. 1, 2014

Related U.S. Application Data

(63) Continuation of application No. 12/364,219, filed on Feb. 2, 2009, now Pat. No. 8,843,405.

(51) Int. Cl.
*G06Q 40/00* (2012.01)
*G06Q 20/42* (2012.01)
*G06Q 40/02* (2012.01)

(52) U.S. Cl.
CPC ............ *G06Q 20/42* (2013.01); *G06Q 40/02* (2013.01)

(58) Field of Classification Search
CPC .................................................... G06Q 20/42
See application file for complete search history.

(56) References Cited

U.S. PATENT DOCUMENTS

| | | | |
|---|---|---|---|
| 8,843,405 B1* | 9/2014 | Hartman | G06Q 40/02 705/30 |
| 2007/0106558 A1* | 5/2007 | Mitchell | G06Q 20/0453 705/16 |
| 2008/0242279 A1 | 10/2008 | Ramer et al. | |
| 2008/0270246 A1 | 10/2008 | Chen | |
| 2008/0275748 A1 | 11/2008 | John | |
| 2008/0275820 A1 | 11/2008 | Joao et al. | |

FOREIGN PATENT DOCUMENTS

WO  WO 2008/005018 A2  1/2008

OTHER PUBLICATIONS

Internet article, *CyberCard (Pty) Ltd.—Permit Server*, CyberCard—Specializing in Wireless Applications, http://home.intekom.com/cyberex/index.htm, 3 pp.
Office Action dated Dec. 27, 2010 for U.S. Appl. No. 12/364,219.
Office Action dated Jul. 21, 2011 for U.S. Appl. No. 12/364,219.
Office Action dated Dec. 21, 2012 for U.S. Appl. No. 12/364,219.
Office Action dated Jun. 17, 2013 for U.S. Appl. No. 12/364,219.

* cited by examiner

*Primary Examiner* — Russell S Glass
(74) *Attorney, Agent, or Firm* — Fletcher Yoder, P.C.

(57) ABSTRACT

A system for providing card account controls and purchase impact information may comprise at least one subsystem that receives information regarding a potential purchase of a customer, and at least one subsystem that provides potential purchase impact information to the customer based on the information regarding the potential purchase of the customer.

17 Claims, 7 Drawing Sheets

SYSTEMS AND METHODS FOR PROVIDING CARD ACCOUNT CONTROLS AND PURCHASE IMPACT INFORMATION

CROSS REFERENCE TO RELATED APPLICATION

This application is a continuation application that claims priority to and the benefit of U.S. Pat. No. 8,843,405, entitled, "SYSTEMS AND METHODS FOR PROVIDING CARD ACCOUNT CONTROLS AND PURCHASE IMPACT INFORMATION," filed Feb. 2, 2009, which is hereby incorporated by reference in its entirety for all purposes.

BACKGROUND

Currently, buyers both young and old often make purchases without considering the impact of doing so. The ubiquitous use and acceptance of credit cards and debit cards and overdraft protection loans make large sums of money easily available to make purchases quickly on impulse. This applies to debit card, credit card and checkbook use, all leading back to an account. Each scenario, whether it is a credit card purchase, debit card purchase or use of a checkbook has a different impact on the buyer and their financial condition, but the buyer often is not aware of or does not think about the different impacts. Even if a buyer does want to give it serious thought before making a large purchase, a buyer must often make many calculations on the spot or go through their finances at home first if they want to determine if they can really afford to make the purchase, thus perhaps losing an opportunity for a good bargain.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for providing card account controls and purchase impact information are described herein. For several embodiments, a system for providing card account controls and purchase impact information may comprise at least one subsystem that receives information regarding a potential purchase of a customer, and at least one subsystem that provides potential purchase impact information to the customer based on the information regarding the potential purchase of the customer.

Other features and embodiments are described below.

BRIEF DESCRIPTION OF THE DRAWINGS

Systems methods for providing card account controls and purchase impact information are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
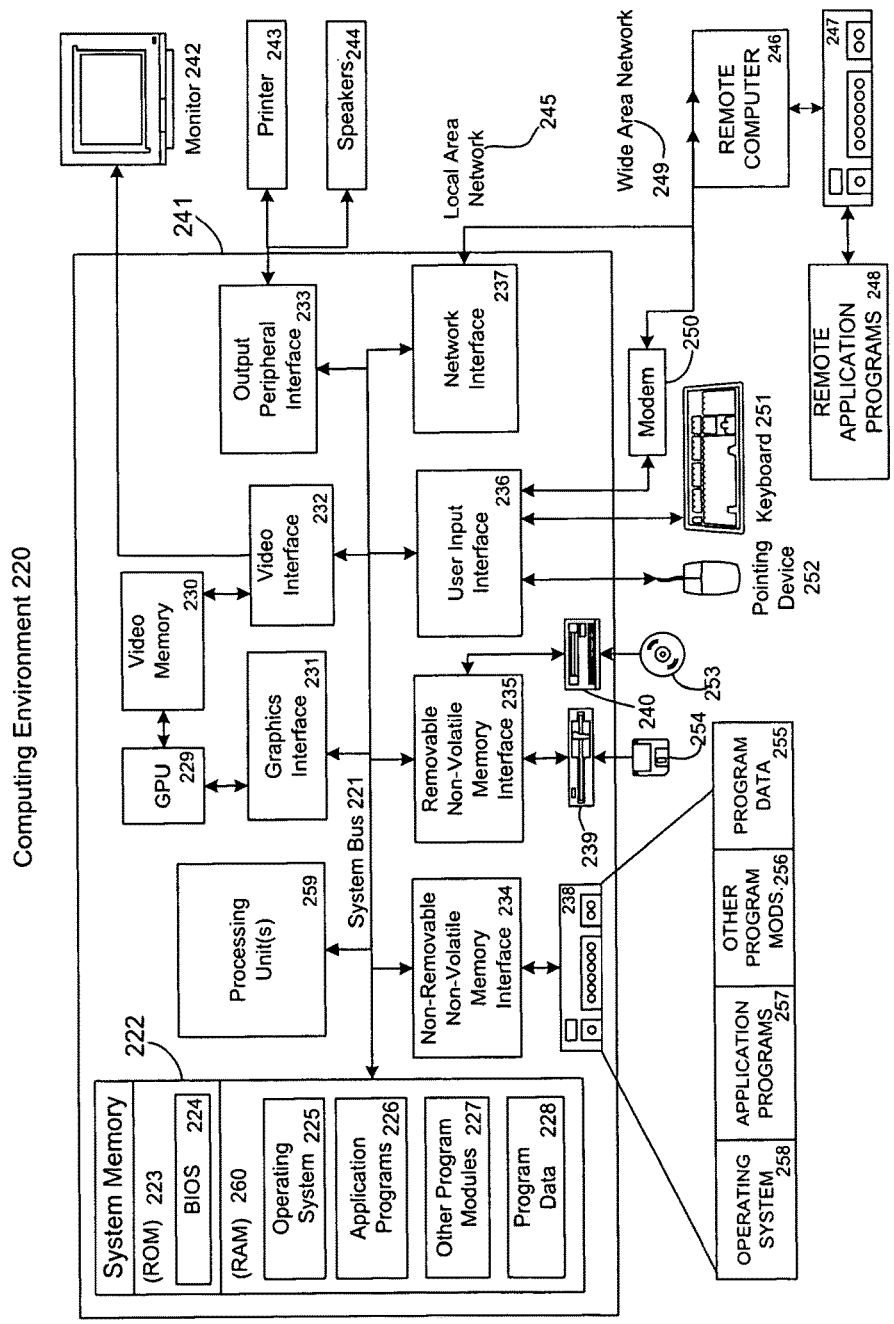
FIG. 1 is a block diagram representing an exemplary computing environment suitable for use in conjunction with implementing systems methods for providing card account controls and purchase impact information.

Referring next to FIG. 1, shown is a block diagram representing an exemplary computing environment suitable for use in conjunction with implementing the processes described below. For example, the computer-executable instructions that carry out the processes and methods for providing card account controls and purchase impact information may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a mobile device may also include one or more items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU), video memory 229, and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. As used herein a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform the intended function of the system or subsystem. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Figure 2:
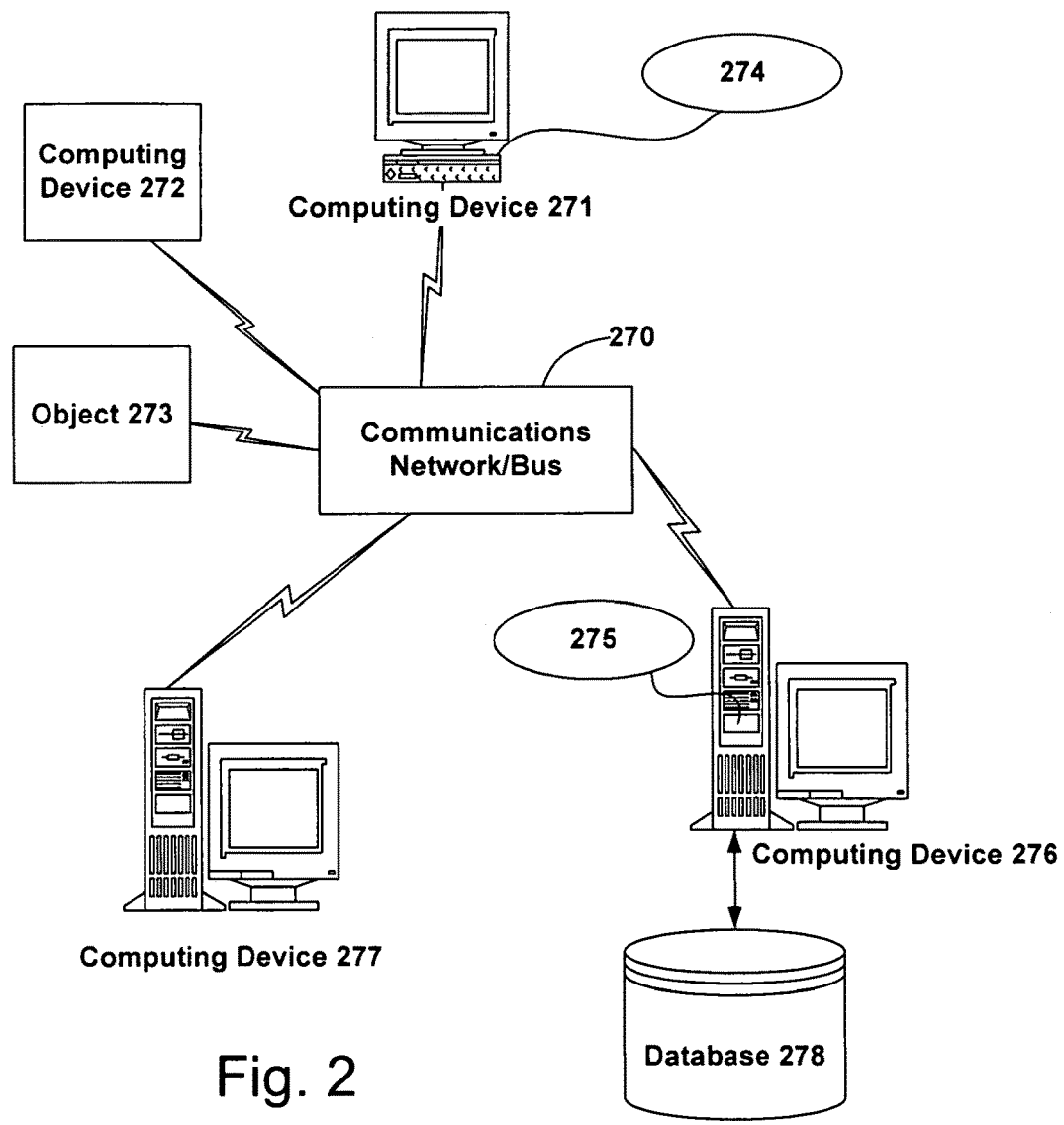
FIG. 2 illustrates an exemplary networked computing environment in which many computerized processes may be implemented to perform providing card account controls and purchase impact information.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing systems methods for providing card account controls and purchase impact information. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
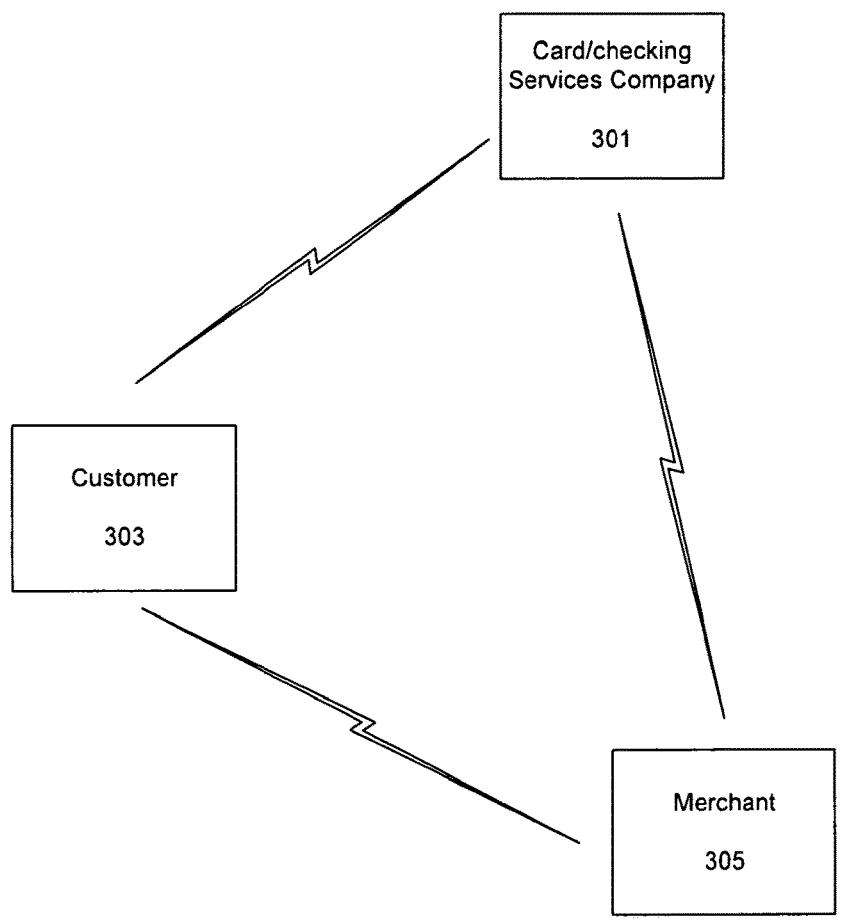
FIG. 3 is a block diagram of an example implementation of a system in which example embodiments and aspects of systems methods for providing card account controls and purchase impact information may be implemented.

Referring next to FIG. 3 shown is a block diagram of an example implementation of a system in which example embodiments and aspects of systems methods for providing card account controls and purchase impact information may be implemented. Shown are an example card/checking services company 301, an example customer 303, and an example merchant 305. The card/checking services company may be a bank, financial services company, card issuing company, or any organization that provides services for making purchases by use of a card account or checking account. The card account may include but is not limited to one or more of the following types of accounts: credit card, debit card, bank card, gift card, prepaid cash card, etc. The example customer 303 is that of the card/checking services company 301 and the example merchant is a company from which the customer 303 may wish to purchase goods or services.

The example card/checking services company 301, example customer 303, and example merchant 305 may be in operable communication with each other as shown in FIG. 3 via one or more networks, such as an intranet, the Internet, a local area network (LAN), a wide area network (WAN), a public switched telephone network (PSTN), a voice over Internet protocol (VoIP) network, a cellular network, satellite network, or other short or long range wireless network, etc. Also, the example customer 303 may visit the example merchant 301 at a physical location of the merchant 301 in order to communicate with the merchant. The example card/checking services company 301, example customer 303, and example merchant 305 may have on-site or remote access to one or more computing systems and/or networked computing environments, such as, for example, those described above with respect to FIGS. 1 and 2 for computing, data storage and/or communications purposes such as required for running, implementing and/or using systems methods for providing card account controls and purchase impact information described herein. The example card/checking services company 301, example customer 303, and example merchant 305 also include any agents or vendors representing the example card/checking services company 301, example customer 303, and example merchant 305, respectively. Any reference herein to a card/checking services company, customer, or merchant also includes any agents or vendors representing the card/checking services company, customer, or merchant, respectively.

Figure 4:
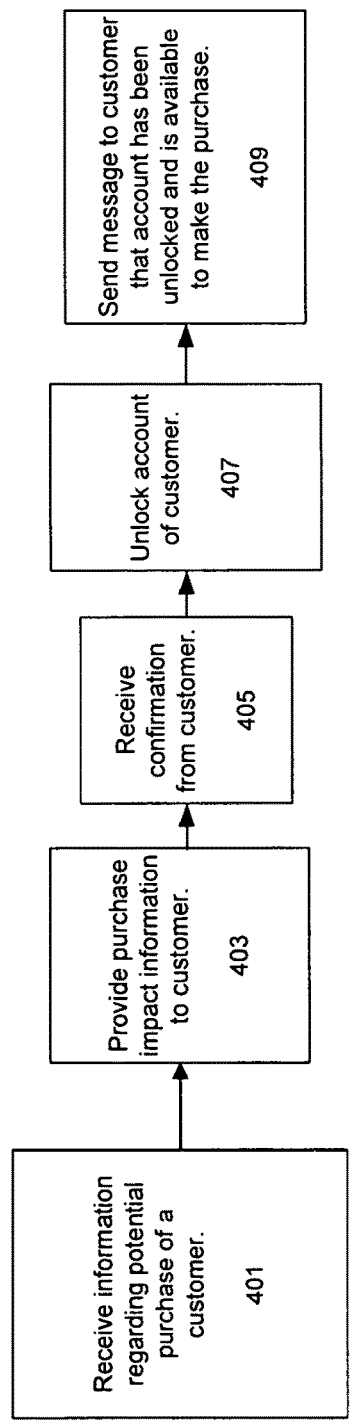
FIG. 4 is a flow chart illustrating an example process for providing card account controls and purchase impact information.

Referring next to FIG. 4, shown is a flow chart illustrating an example process for providing card account controls and purchase impact information. First, information is received (401) regarding a potential purchase of a customer. This information may be received from the customer, for example, and may be received through any number of channels including but not limited to one or more of the following: phone, text message, internet, email, credit card/checking services company web site, merchant card system, etc. For example, a customer may use a mobile communications device such as a cellular phone or mobile computing device to enter such information into the device and then communicate such information to the card/checking services company. A software application may be running on the customer device to provide an interface to input such information regarding a potential purchase of a customer and facilitate the communication of such information regarding a potential purchase of a customer to the card/checking services company.

Also, information regarding a potential purchase may be scanned or read using a bar code scanner to scan a bar code associated with an item to be purchased or such information may be read using a radio frequency identification (RFID) reader to read an RFID tag associated with item. Such scanners may be stand alone devices in operable communications with the card/checking services company, or integrated with the customer's device wherein the software application on the device is configured to read the scanned information of the item and facilitate the communication of such information regarding a potential purchase of the item to the card/checking services company. Such a software application may also have been provided by the card/checking services company to the customer for installation on the customer's device.

Such information regarding a potential purchase of a customer may be received by the card/checking services company through a communications channel and server software configured to receive such information regarding a potential purchase of a customer. The information regarding a potential purchase of the customer may also be received from a merchant through a merchant's card charge system. For example, when a user attempts to make a purchase, certain information regarding the purchase may be sent along with the purchase attempt to the card/checking services company.

The information regarding a potential purchase of the customer may comprise, but is not limited to one or more of the following: purchase amount, category of purchase, type of purchase, serial number of an item to be purchased, a Uniform Product Code (UPC) of an item to be purchased, information identifying the exact item or services to be purchased, information identifying a merchant, location of a merchant, a merchant code, a merchant name, category of merchant, merchant type, date and/or time purchase is to be made, whether a purchase is being made on an installment plan or a contract, terms regarding any installment plan or contract, whether purchase is for a down payment of an item, whether and when the customer intends to pay off an account on which the purchase is to be charged, etc.

Purchase impact information is then provided (403) to the customer based on the information received regarding the potential purchase of the customer. This purchase impact information may be provided through any number of channels including but not limited to one or more of the following: phone, text message, internet, email, credit card/checking services company web site, merchant charge card system, etc. For example, the card/checking services company may send such purchase impact information to a customer's mobile communications device such as a cellular phone or mobile computing device configured to receive such information on the device. A software application may be running on the customer device configured to receive such purchase impact information and facilitate the display of such information on the device. Such a software application may also have been provided by the card/checking services company to the customer for installation on the customer's device. For example, such purchase impact information may be sent by the card/checking services company through a communications channel and software configured to send such purchase impact information.

The purchase impact information may comprise, but is not limited to, one or more of the following: financial impact to the customer if the purchase is made, financial status of the customer if the purchase is made, financial status over time of the customer if the purchase is made, financial impact comparison figures showing financial status of the customer with and without making the potential purchase, financial impact comparison figures showing financial status over time of the customer with and without making the potential purchase, impact to the customer's budget if the purchase is made, amount left for spending for the customer after the potential purchase in a budget category of the customer in which the potential purchase falls, net worth of the customer if the purchase is made, financial impact to a funding source of the purchase, an account balance after the purchase, amount of interest that would be charged on the purchase given minimum payments would be made to a credit card on which the purchase is placed, amount of interest that would be charged on the purchase to a credit card on which the purchase is placed given an amount of time that will be used to pay for the purchase given by the customer, amount of interest that would be charged on the purchase given information received by customer regarding the purchase, financial impact to one or more retirement goals of the customer if the purchase is made, loss of value over time of a product to be potentially purchased, amount of time the customer would have to work to earn an amount equal to the purchase amount, information regarding a product to be potentially purchased, recall information regarding a product to be potentially purchased, information regarding safety a product to be potentially purchased, information regarding health of a product to be potentially purchased, consumer review information regarding a product to be potentially purchased, etc.

Also, along with the purchase impact information, a request may be sent for the customer to confirm they have read and/or understood the purchase impact information and/or want to make the purchase. A confirmation is then received (405) from the customer through one or more of the channels as described above regarding receiving information regarding potential purchase of a customer. The confirmation may indicate that the customer does indeed want to make the purchase. Then an account on which the purchase is to be charged is unlocked (407) so that the purchase may be made. The account may be unlocked, for example, by the card/checking services company of the account on which the purchase is to be charged. Previously the account may have been locked for all purchases, purchases over a certain amount, and/or purchases falling within a certain category or other criteria. The account may be unlocked, for example, under one or more of the following restrictions: unlocked only for a particular time period, unlocked only up to a particular amount of a purchase matching information received regarding the potential purchase, unlocked only for a purchase to be made falling within a same item category indicated in information received regarding the potential purchase, unlocked only for a purchase to be made at a merchant having a same merchant code indicated in information received regarding the potential purchase, unlocked only for a purchase to be made having the same merchant identification information indicated in information received regarding the potential purchase, unlocked only for a purchase made having same item identification information indicated in information received regarding the potential purchase. A message indicating that the account has been unlocked and is available to make the purchase may then be sent (409) to the customer through one or more channels as described above regarding providing purchase impact information to the customer.

Figure 5:
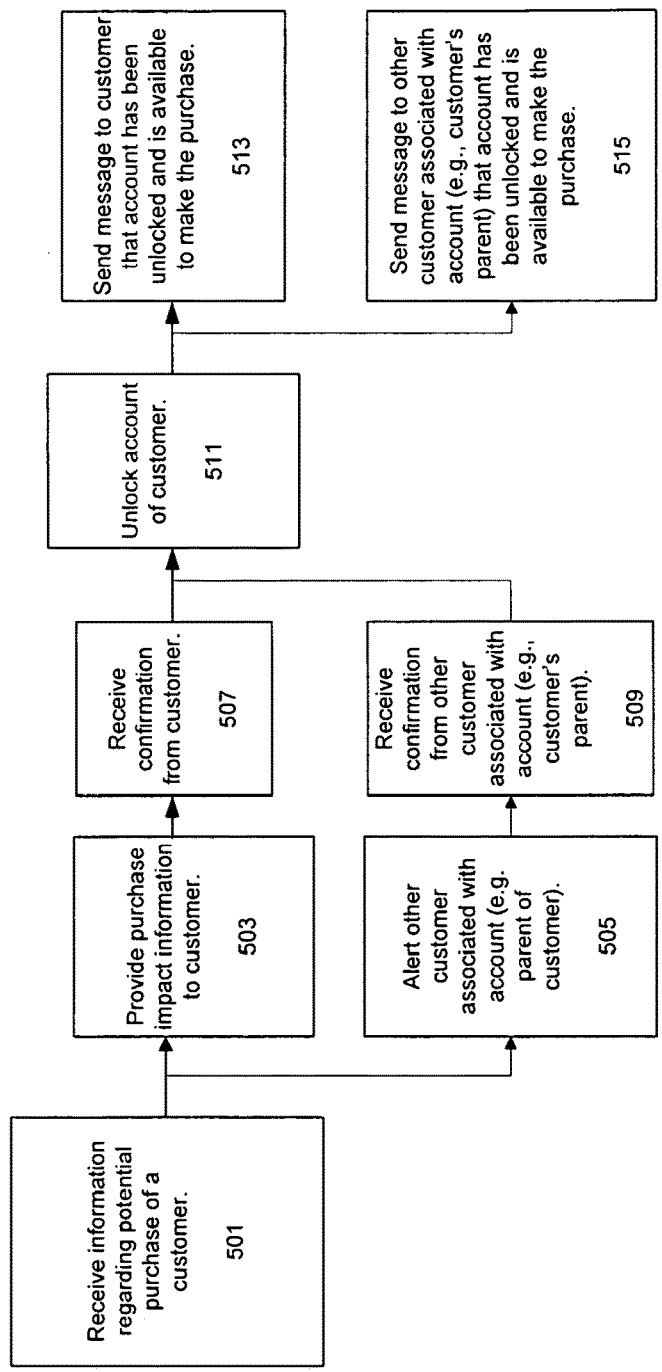
FIG. 5 a flow chart illustrating an example process for providing card account controls and purchase impact information involving alerting other customers associated with an account of a customer.

Referring next to FIG. 5, shown is a flow chart illustrating an example process for providing card account controls and purchase impact information involving alerting other customers associated with an account of a customer. First, information is received (501) regarding a potential purchase of a customer as described above, for example. Purchase impact information is then provided (503) to the customer based on the information received regarding the potential purchase of the customer. This purchase impact information may be provided through any number of channels using any number of devices, for example, as described above. The purchase impact information may also comprise information such as that purchase impact information described above.

Also, an alert may be sent (505) to one or more other customers associated with an account of the customer on which the potential purchase is to be charged. This alert may be sent through any number of channels using any number of devices, for example, as described above for sending purchase impact information to the customer. These one or more other customers may, for example, be a parent or spouse of the customer, or may be another person that has been placed on the account of the customer. This alert may also comprise purchase impact information as described above. However, the exact purchase impact information included in the alert provided to the one or more other customers associated with the account need not be the same as that provided to the customer.

Also, along with the purchase impact information and alert, a request may be sent for the customer and one or more other customers to whom the alert was sent for a confirmation. For the customer, the request may include a request for the customer to confirm they have read and/or understood the purchase impact information and/or want to make the purchase. For the one or more other customers to whom the alert was sent for a confirmation, the request may include, for example, a request for them to confirm that they agree to the purchase. A confirmation is then received (507) from the customer through one or more of the channels as described above regarding receiving information regarding potential purchase of a customer. The confirmation may indicate that the customer does indeed want to make the purchase. A confirmation may also be received (509) through one or more of the channels as described above regarding receiving information regarding potential purchase of a customer from the one or more other customers to whom the alert was sent.

Once the confirmation from the customer and the confirmation from the one or more other customers to whom the alert was sent are received, then an account on which the purchase is to be charged is unlocked (511) so that the purchase may be made. The account may be unlocked, for example, by the card/checking services company of the account on which the purchase is to be charged. Previously, the account may have been locked for all purchases, purchases over a certain amount, and/or purchases falling within a certain category or other criteria. The account may be unlocked, for example, under one or more of the restrictions described above regarding account unlocking restrictions. A message indicating that the account has been unlocked and is available to make the purchase may then be sent (513) to the customer and/or sent (515) to the one or more other customers to whom the alert was sent. These messages sent to the customer and one or more other customers associated with the account need not contain the exact same information and may be sent through one or more channels as described above regarding providing purchase impact information to the customer.

Figure 6:
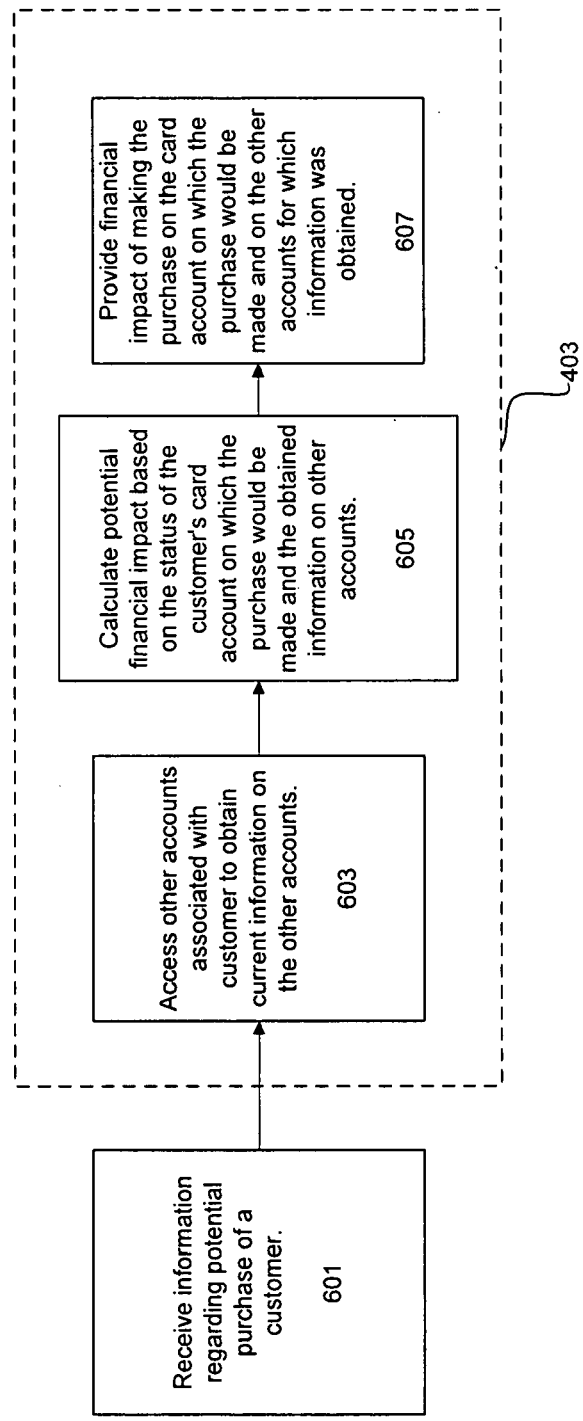
FIG. 6 is a flow chart illustrating an example process for providing purchase impact information regarding various accounts of a customer.

Referring next to FIG. 6, shown is a flow chart illustrating an example process for providing purchase impact information regarding various accounts of a customer. First, information is received (601) regarding a potential purchase of a customer as described above, for example. Then purchase impact information is then provided (407) to the customer based on the information received regarding the potential purchase of the customer. In particular, providing the portion of this purchase impact information regarding various accounts of a customer may comprise first accessing (603) other accounts associated with customer to obtain current information on the other accounts. These other accounts may comprise, for example, one or more of the following accounts of the customer: checking accounts, savings accounts, retirement accounts, investment accounts, insurance accounts, trading accounts, etc. One or more of the accounts above may be accessed directly by the card/checking services company if the accounts are also held, controlled or managed internally by the card/checking services company, may be accessed remotely, and/or may be accessed through information gathering service providers such as $3^{rd}$ party account aggregation service providers, for example. The one or more accounts above may also be accessed through any number of communication channels and/or networks including, but not limited to an intranet, the Internet, a local area network (LAN), a wide area network (WAN), a public switched telephone network (PSTN), a voice over Internet protocol (VoIP) network, a cellular network, satellite network, or other short or long range wireless network, etc.

The potential impact if the purchase is made is then calculated (605) based on the status of the customer's card account on which the purchase would be made and the obtained information regarding other accounts. For example, making the purchase on the customer's credit card may require the customer to pay back the purchase out of another account, whose balance would then be affected by the purchase. In order to project what the balance of the other account from which the credit card payment would be made, the other account's current balance would need to be obtained. As another example, making the purchase might affect the customer's net worth, and to calculate the customer's net worth and to provide what the customer's net worth would after the purchase, current information on the customer's other accounts may need to be obtained. The potential financial impact of making the purchase on the card account on which the purchase would be made and on the other accounts for which information was obtained is then provided (607) as part of, or entirely as, the purchase impact information described in FIG. 4. This purchase impact information may be provided through any number of channels using any number of devices, for example, as described above.

Figure 7:
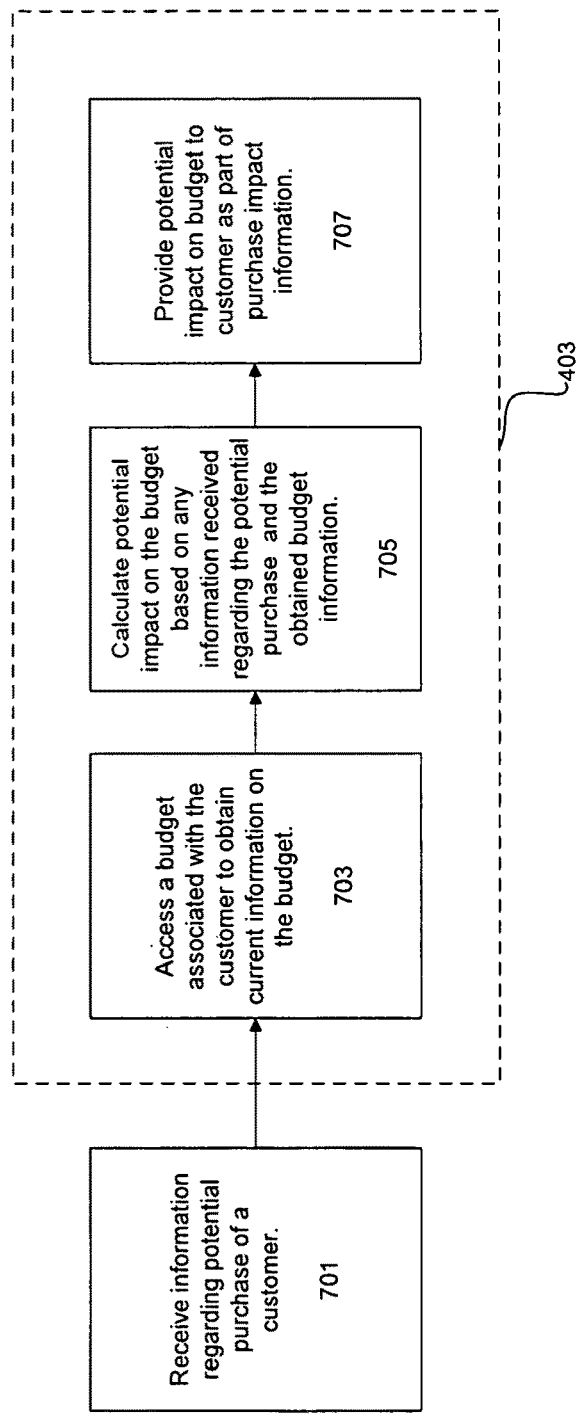
FIG. 7 is a flow chart illustrating an example process for providing purchase impact information regarding a budget of a customer.

Referring next to FIG. 7, shown is a flow chart illustrating an example process for providing purchase impact information regarding a budget of a customer. First, information is received (701) regarding a potential purchase of a customer as described above, for example. Then purchase impact information is then provided (407) to the customer based on the information received regarding the potential purchase of the customer. In particular, providing the portion of this purchase impact information regarding a budget of a customer may comprise first accessing (703) a budget associated with the customer to obtain current information on the budget. This budget information may be include, but is not limited to, one or more of the following: weekly, monthly, quarterly, yearly or other periodic budgeted amounts, budget categories, current amount spent in one or more budget categories, current amount left to spend in one or more budget categories, current income, spending history, etc.

The above budget information may be accessed directly by the card/checking services company if the budget information is stored, managed or maintained internally by the card/checking services company, may be accessed remotely such as from a device of the customer or other entity, and/or may be accessed through information gathering service providers such as $3^{rd}$ party account aggregation service providers, for example. The budget information above may also be accessed through any number of communication channels and/or networks including, but not limited to an intranet, the Internet, a local area network (LAN), a wide area network (WAN), a public switched telephone network (PSTN), a voice over Internet protocol (VoIP) network, a cellular network, satellite network, or other short or long range wireless network, etc.

The potential impact on the budget is then calculated (705) based on any information received regarding the potential purchase of the customer and the obtained budget information. For example, if the potential purchase is for an amount of y dollars, and falls within a particular budget category with a current amount of spending money left of x dollars, then the information provided regarding the impact to the budget may indicate that the amount of money left in that category to spend for the customer as being x–y dollars after the purchase. The potential financial impact on the budget may then be provided (707) as part of, or entirely as, the purchase impact information described in FIG. 4. This purchase impact information may be provided through any number of channels using any number of devices, for example, as described above.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A non-transitory, computer readable medium storing instructions executable by a processor of a server of a card/checking services company to provide card account controls and purchase impact information, the instructions comprising computer readable instructions for:

receiving, from a card charge system, information regarding a potential purchase using a card account of a customer;

generating potential purchase impact information based on the information regarding the potential purchase of the customer;

providing the potential purchase impact information to a mobile computing device of the customer;

receiving a confirmation from the mobile computing device of the customer indicating that the customer has received the potential purchase impact information and desires to make the potential purchase; and unlocking the card account of the customer on which the potential purchase is to be made in response to receiving the confirmation.

2. The computer readable medium of claim 1, wherein the computer readable instructions for generating and providing the potential purchase impact information to the mobile device of the customer comprise computer readable instructions for:

accessing account information regarding the card account on which the potential purchase is to be made;

calculating a potential financial impact on the card account based on the information accessed regarding the card account and the information received regarding the potential purchase of the customer; and providing information to the mobile computing device of the customer regarding a financial impact of making the potential purchase using the card account on which the potential purchase is to be made based on the calculated potential financial impact on the card account.

3. The computer readable medium of claim 2, further comprising computer readable instructions for:

accessing one or more other accounts associated with the customer to obtain current information on the other accounts;

calculating a potential financial impact on at least one of the one or more other accounts based on the information accessed regarding the one or more other accounts and the information received regarding the potential purchase of the customer; and providing information to the mobile computing device of the customer regarding a financial impact of making the potential purchase on at least one of the one or more other accounts based on the calculated potential financial impact on at least one of the one or more other accounts.

4. The computer readable medium of claim 1, wherein the potential purchase impact information is selected from the group consisting of one or more of the following: financial impact to the customer if the potential purchase is made, financial status of the customer if the potential purchase is made, financial status over time of the customer if the potential purchase is made, financial impact comparison figures showing financial status of the customer with and without making the potential purchase, financial impact comparison figures showing financial status over time of the customer with and without making the potential purchase, impact to the customer's budget if the potential purchase is made, amount left for spending for the customer after the potential purchase in a budget category of the customer in which a potential purchase falls, net worth of the customer if the potential purchase is made, financial impact to a funding source of the potential purchase, an account balance after the potential purchase, amount of interest that would be charged on the potential purchase given minimum payments would be made to a credit card on which the potential purchase is placed, amount of interest that would be charged on the potential purchase to a credit card on which the potential purchase is placed given an amount of time that will be used to pay for the potential purchase given by the customer, amount of interest that would be charged on the potential purchase given information received by customer regarding the potential purchase, financial impact to one or more retirement goals of the customer if the potential purchase is made, loss of value over time of a product to be potentially purchased, amount of time the customer would have to work to earn an amount equal to the potential purchase amount, information regarding a product to be potentially purchased, recall information regarding a product to be potentially purchased, information regarding safety of a product to be potentially purchased, information regarding health of a product to be potentially purchased, and consumer review information regarding a product to be potentially purchased.

5. The computer readable medium of claim 1, wherein the computer readable instructions for generating and providing the potential purchase impact information to the mobile computing device of the customer comprise computer readable instructions for:

accessing a budget associated with the customer to obtain current information on the budget;

calculating a potential impact on the budget based on any information received regarding the potential purchase and the obtained current information on the budget; and providing information regarding the potential impact on the budget to the customer.

6. The computer readable medium of claim 5, wherein the computer readable instructions for calculating the potential impact on the budget comprise computer readable instructions for:

determining an amount left to spend in a particular category of the budget based on the obtained current information;

subtracting from the amount left to spend an amount equal to an amount of the potential purchase; and storing the result of the subtraction as at least part of the information regarding the potential impact on the budget.

7. The computer readable medium of claim 1, further comprising computer readable instructions for sending a message to the mobile computing device of the customer that the card account has been unlocked and is available to make the potential purchase.

8. The computer readable medium of claim 1, wherein the computer readable instructions for providing the purchase impact information comprise instructions for sending the purchase impact information through a network for display on the mobile computing device of the customer.

9. The computer readable medium of claim 1, further comprising computer readable instructions for providing an alert to one or more other customers associated with the card account of the customer on which the potential purchase is to be made based on the information regarding the potential purchase of the customer.

10. The computer readable medium of claim 1, wherein the potential purchase impact information is selected from the group consisting of one or more of the following: financial impact to the customer if the potential purchase is made, financial status of the customer if the potential purchase is made, and financial status over time of the customer if the potential purchase is made.

11. The computer readable medium of claim 1, wherein the potential purchase impact information is selected from the group consisting of one or more of the following: financial impact comparison figures showing financial status of the customer with and without making the potential purchase, and financial impact comparison figures showing financial status over time of the customer with and without making the potential purchase.

12. The computer readable medium of claim 1, wherein the potential purchase impact information comprises information regarding an amount of interest related to the potential purchase.

13. The computer readable medium of claim 12, wherein the information regarding the amount of interest related to the potential purchase is selected from the group consisting of one or more of the following: the amount of interest that would be charged on the potential purchase given minimum payments would be made to a credit card on which the potential purchase is placed, the amount of interest that would be charged on the potential purchase to a credit card on which the potential purchase is placed given an amount of time that will be used to pay for the potential purchase given by the customer, and the amount of interest that would be charged on the potential purchase given information received by customer regarding the potential purchase.

14. The computer readable medium of claim 1, wherein the potential purchase impact information is selected from the group consisting of one or more of the following: net worth of the customer if the potential purchase is made, amount of time the customer would have to work to earn an amount equal to the potential purchase amount, and financial impact to one or more retirement goals of the customer if the potential purchase is made.

15. The computer readable medium of claim 1, wherein the potential purchase impact information comprises information regarding a product that is part of the potential purchase.

16. The computer readable medium of claim 15, wherein the information regarding the product is selected from the group consisting of one or more of the following: loss of value over time of the product, recall information regarding the product, information regarding safety of the product, information regarding health of the product, and consumer review information regarding the product.

17. The computer readable medium of claim 1, wherein the information regarding the potential purchase is received from the card charge system positioned at a physical location of a merchant.

* * * * *

UNITED STATES PATENT AND TRADEMARK OFFICE
CERTIFICATE OF CORRECTION

| | | |
|---|---|---|
| PATENT NO. | : 10,019,714 B1 | Page 1 of 1 |
| APPLICATION NO. | : 14/449892 | |
| DATED | : July 10, 2018 | |
| INVENTOR(S) | : Hartman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 184 days.

Signed and Sealed this
Thirtieth Day of July, 2019

Andrei Iancu
*Director of the United States Patent and Trademark Office*